United States Patent
Takano

(10) Patent No.: US 9,280,235 B2
(45) Date of Patent: Mar. 8, 2016

(54) PORTABLE ELECTRONIC DEVICE

(71) Applicant: PANASONIC INTELLECTUAL PROPERTY CORPORATION OF AMERICA, Torrance, CA (US)

(72) Inventor: Tomoki Takano, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/413,491

(22) PCT Filed: Jul. 3, 2013

(86) PCT No.: PCT/JP2013/004146
§ 371 (c)(1),
(2) Date: Jan. 8, 2015

(87) PCT Pub. No.: WO2014/041732
PCT Pub. Date: Mar. 20, 2014

(65) Prior Publication Data
US 2015/0138083 A1    May 21, 2015

(30) Foreign Application Priority Data
Sep. 13, 2012 (JP) ................... 2012-201617

(51) Int. Cl.
*G06F 3/041* (2006.01)
*G06F 3/045* (2006.01)
(Continued)

(52) U.S. Cl.
CPC ............. *G06F 3/0418* (2013.01); *G06F 3/041* (2013.01); *G06F 3/0481* (2013.01); *G06F 3/0488* (2013.01)

(58) Field of Classification Search
CPC ....... G05B 15/02; G06F 3/041; G06F 3/0488; G06F 2203/04108; G06F 3/04842; G06F 3/03549; G06F 3/04845; G06F 3/0485
USPC .................................................. 345/156–178
See application file for complete search history.

(56) References Cited

U.S. PATENT DOCUMENTS

| | | | |
|---|---|---|---|
| 8,913,029 B2 | 12/2014 | Takano et al. | |
| 2008/0042985 A1* | 2/2008 | Katsuhito | ............... G06F 3/044 345/173 |

(Continued)

FOREIGN PATENT DOCUMENTS

| | | |
|---|---|---|
| JP | 04-130518 | 5/1992 |
| JP | 2004-220133 | 8/2004 |

(Continued)

OTHER PUBLICATIONS

U.S. Appl. No. 14/414,785 to Tomoki Takano, which was filed on Jan. 14, 2015.

(Continued)

*Primary Examiner* — Kent Chang
*Assistant Examiner* — Nelson Rosario
(74) *Attorney, Agent, or Firm* — Greenblum & Bernstein, P.L.C.

(57) ABSTRACT

A portable electronic device includes a display unit on which a pointer is displayable, and a touch panel which is arranged to overlap the display unit and is capable of detecting a distance from an indicator. The pointer moves according to a movement of the indicator, and when the distance is equal to or less than a first distance and is greater than a second distance smaller than the first distance in a predetermined region of the touch panel, a length of the movement of the pointer has a predetermined magnification to a length of the movement of the indicator.

10 Claims, 13 Drawing Sheets

(51) Int. Cl.
*G06F 3/0488* (2013.01)
*G06F 3/0481* (2013.01)

(56) References Cited

U.S. PATENT DOCUMENTS

| | | |
|---|---|---|
| 2010/0177041 A1 | 7/2010 | Chen |
| 2010/0302205 A1 | 12/2010 | Noma |
| 2011/0096024 A1* | 4/2011 | Kwak ............... G06F 3/044 345/174 |
| 2011/0193811 A1 | 8/2011 | Katsuhito et al. |
| 2012/0162105 A1* | 6/2012 | Sakurai ............. G06F 3/0488 345/173 |
| 2014/0028557 A1 | 1/2014 | Otake et al. |
| 2014/0176510 A1 | 6/2014 | Nakao |
| 2014/0240251 A1 | 8/2014 | Takano et al. |
| 2014/0267154 A1 | 9/2014 | Yamaguchi et al. |
| 2014/0362017 A1 | 12/2014 | Yamaguchi |
| 2015/0042610 A1 | 2/2015 | Takano et al. |

FOREIGN PATENT DOCUMENTS

| | | |
|---|---|---|
| JP | 2007-287118 | 11/2007 |
| JP | 2010-160774 | 7/2010 |

OTHER PUBLICATIONS

International Search Report (ISR) in International Patent Application No. PCT/JP2013/004146, dated Aug. 13, 2013.
Notification of Reasons for Refusal from Japan Patent Office (JPO) in Japanese Patent Application No. 2014-535354, dated Nov. 4, 2014, together with an English language translation thereof.
Notice of Allowance from Japan Patent Office (JPO) in Japanese Patent Application No. 2014-535354, dated Jan. 27, 2015.

* cited by examiner

FIG.3
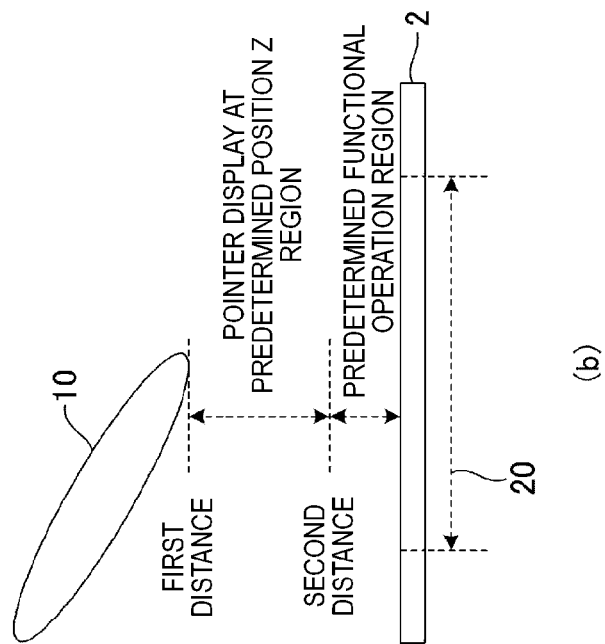
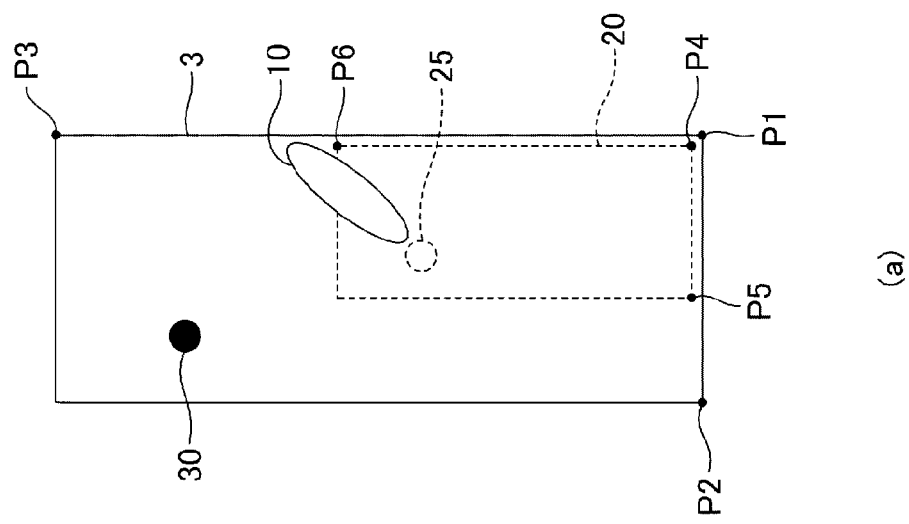

(a)　　　　　　　　(b)

PORTABLE ELECTRONIC DEVICE

TECHNICAL FIELD

The present invention relates to a portable electronic device equipped with a touch panel.

BACKGROUND ART

As known in the art, a touch panel is constituted by combining a display device, such as a liquid crystal panel, and a touch pad (a position input device).

As an example where movement speed of a cursor displayed on a display device of touch panel is switchable, a technique described in Patent Literature 1 is known. A multiple variable speed cursor control method for a touch pad described in Patent Literature 1 has two or more speed parameter arithmetic expressions, and the method calculates a speed parameter using a first arithmetic expression when a push switch is in an on state, while calculates the speed parameter using a second arithmetic expression when the push switch is in an off state, and a movement vector of a screen cursor is obtained by multiplying a finger coordinate change vector by the speed parameter.

CITATION LIST

Patent Literature

Patent Literature 1: JP-A-2010-160774

SUMMARY OF INVENTION

Technical Problem

In a portable electronic device equipped with a touch panel, such as a smartphone, with an increase in screen size, it is difficult to touch an upper portion of a screen with one hand. For example, it is not possible to access an icon at a position away from a finger among a plurality of icons displayed on the screen by one-hand operation.

In the portable electronic device equipped with a touch panel, such as a smartphone, if a physical pad mounted in a notebook PC is mounted at a place different from the screen, the screen size decreases by that much. That is, the display device to be mounted decreases in screen size. Even if a pad is arranged virtually in an image display region, an available display region decreases.

The present invention has been accomplished in consideration of the above situation, and an object of the present invention is to provide a portable electronic device capable of allowing easy access to an icon at a position hard to reach with a finger by one-hand operation and effectively using a display region of a display unit.

Solution to Problem

A portable electronic device includes: a display unit on which a pointer is displayable; and a touch panel which is arranged to overlap the display unit and is capable of detecting a distance from an indicator, and the pointer moves according to a movement of the indicator, and when the distance is equal to or less than a first distance and is greater than a second distance smaller than the first distance in a predetermined region of the touch panel, a length of the movement of the pointer has a predetermined magnification to a length of the movement of the indicator.

According to the above-described configuration, a pointer moves at a predetermined magnification with respect to a motion of an indicator (for example, "finger") within a predetermined distance range (within a range equal to or less than a first distance and greater than a second distance smaller than the first distance) over a predetermined region of the touch panel. Accordingly, it is possible to allow easy access to an icon hard to reach with a finger by one-hand operation. The predetermined region of the touch panel virtually serves as a pad, and the region is transmissive, whereby it is possible to effectively use the display region of the display unit without causing a decrease in effective display area.

In the above configuration, the second distance is zero.

In the above configuration, the movement of the indicator is a movement along a surface of the touch panel.

In the above configuration, the predetermined magnification is greater than 1.

In the above configuration, the display unit has a first shape in plan view, the predetermined region has a second shape in plan view, and the first shape has an area greater than the second shape.

In the above configuration, the first shape is a similitude of the second shape.

In the above configuration, the predetermined magnification is substantially the same as a similitude ratio between the first shape and the second shape.

In the above configuration, an icon is displayable on the display unit, and when the pointer overlaps the icon, and when the distance is at least equal to or less than the second distance, a function corresponding to the icon is activated.

According to the above-described configuration, it is possible to allow access to an icon hard to reach with a finger by one-hand operation, and the pointer is brought to an intended icon and the indicator then approaches the touch panel by the second distance or less, whereby it is possible to activate a function correlated with the intended icon.

In the above configuration, the predetermined region is graphically displayable using a figure.

According to the above-described configuration, it is possible to visualize the predetermined region.

In the above configuration, the portable electronic device includes at least a first mode and a second mode, in the first mode, the pointer moves according to the movement of the indicator, when the distance is equal to or less than the first distance and greater than the second distance in at least the predetermined region, a length of the movement of the pointer is a predetermined magnification greater than 1 to a length of the movement of the indicator, and a function is executable corresponding to a position of the pointer, and in the second mode, a function is executable corresponding to a position of the indicator.

In the above configuration, the first mode is switchable to the second mode by a first operation.

In the above configuration, the second mode is switchable to the first mode by a second operation.

In the above configuration, the first operation and the second operation indicate a common operation.

In the above configuration, the predetermined region is configurable.

In the above configuration, the predetermined region is configurable by selection of a user from a plurality of predetermined regions prepared in advance.

In the above configuration, the predetermined region is configurable by a movement or/and a modification of the figure by a user.

In the above configuration, the portable electronic device includes at least a first mode and a third mode, in the first mode, the pointer moves according to a movement of the indicator, and in the third mode, the predetermined region is displayed.

In the above configuration, in the third mode, the figure is displayed with a predetermined transmittance.

In the above configuration, in the first mode, the pointer moves according to the movement of the indicator, and the predetermined region is graphically displayed using a figure having a first transmittance, and in the third mode, the predetermined region is graphically displayed using a figure having a second transmittance smaller than the first transmittance.

In the above configuration, in the first mode, the predetermined region is not displayed.

In the above configuration, in at least the third mode, the predetermined region is configurable.

Advantageous Effects of Invention

According to the present invention, it is possible to allow easy access to an icon hard to reach with a finger by one-hand operation and to effectively use the display region of the display unit.

BRIEF DESCRIPTION OF DRAWINGS

In FIG. 3, (a) and (b) are diagrams illustrating a pointer mode of the portable electronic device of FIG. 1.

DESCRIPTION OF EMBODIMENTS

Figure 1:
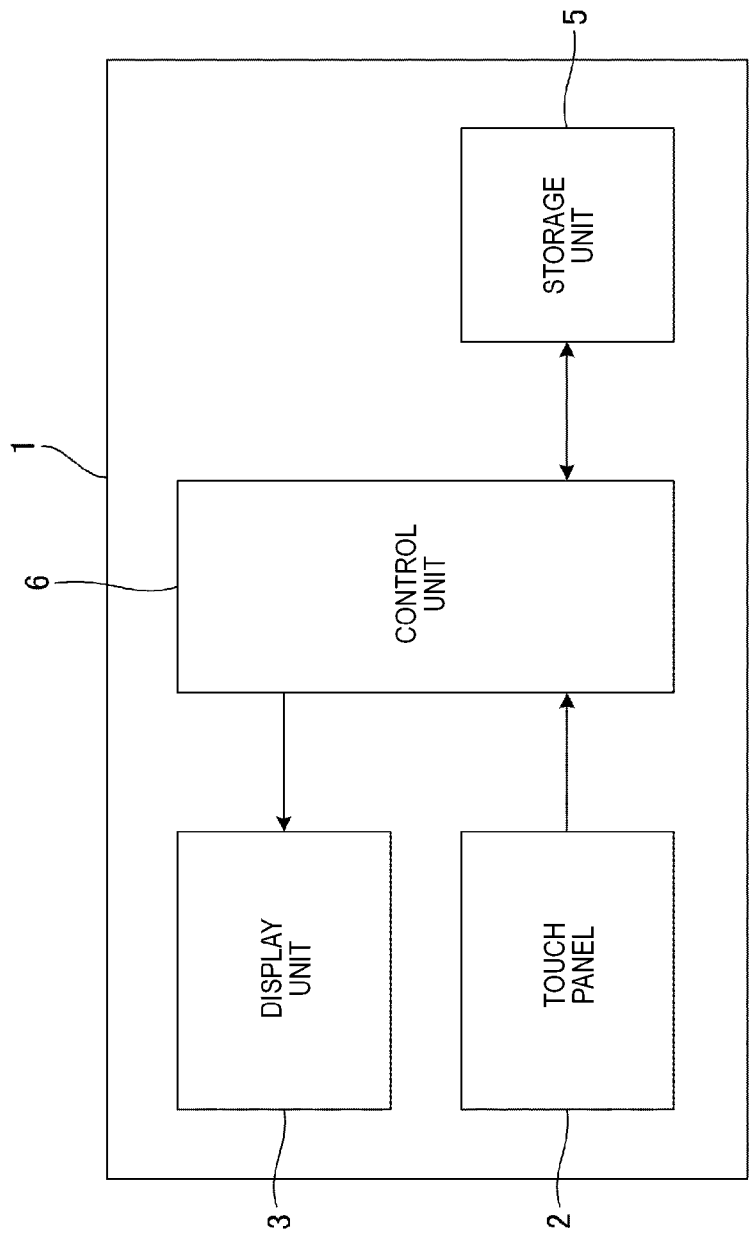
FIG. 1 is a block diagram showing the schematic configuration of a portable electronic device according to an embodiment of the present invention.

Hereinafter, a preferred embodiment for carrying out the present invention will be described in detail referring to the drawings.

Figure 2:
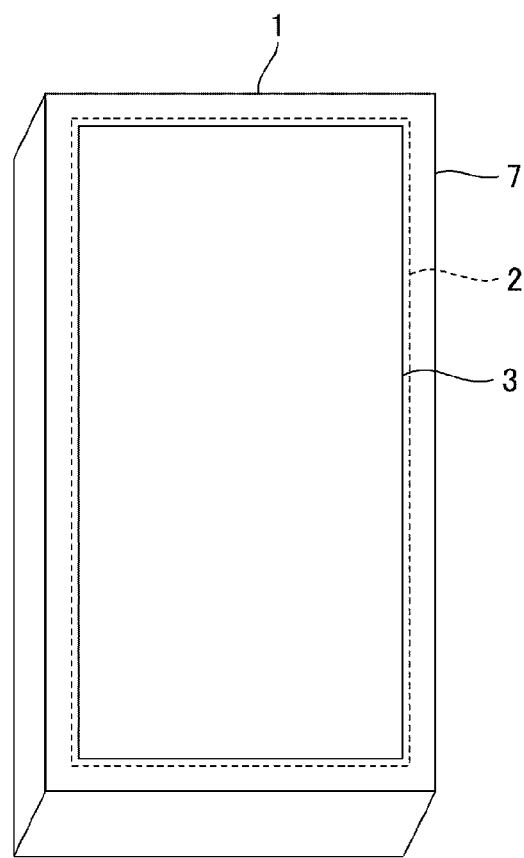
FIG. 2 is a perspective view showing the overview of the portable electronic device of FIG. 1.

FIG. 1 is a block diagram showing the schematic configuration of a portable electronic device according to an embodiment of the present invention. FIG. 2 is a perspective view showing the overview of the portable electronic device of FIG. 1. A portable electronic device 1 according to this embodiment is applied to, for example, a mobile radio device, called a smartphone, and in FIG. 1, a portion relating to communication as a radio device is not shown.

As shown in FIG. 1, the portable electronic device 1 of this embodiment includes a touch panel 2, a display unit 3, a storage unit 5, and a control unit 6. As shown in FIG. 2, the portable electronic device 1 of this embodiment has a longitudinal rectangular housing 7, and the touch panel 2 and the display unit 3 having an area slightly smaller than the area of the front surface of the housing 7 are arranged on the front side of the housing 7. The touch panel 2 is arranged on the front side of the display unit 3 in an overlapping manner. The display unit 3 has a longitudinal rectangular shape which is a first shape in plan view.

The touch panel 2 is of an electrostatic capacitance type in which an operation (this is referred to as "hover operation") at a height in a predetermined range is possible without bringing an indicator (e.g., a user's finger or a pen, or the like, and in this embodiment, treated as "finger") into contact with the panel surface. The touch panel 2 includes a transmission electrode and a reception electrode (not shown), and these electrodes are arranged separately from each other on the lower surface of a plate-shaped dielectric. A drive pulse based on a transmission signal is applied to the transmission electrode. An electric field is generated from the transmission electrode by applying the drive pulse to the transmission electrode, and if the finger enters the electric field, the number of electric lines of force between the transmission electrode and the reception electrode decreases, and a change in the number of electric lines of force appears as a change in electric charges in the reception electrode. The touch panel 2 detects the finger from a reception signal according to the change in electric charges in the reception electrode, and coordinate data (X,Y) and distance data (Z) of the finger are output to the control unit 6.

The display unit 3 has a longitudinal rectangular shape and is used in display for operating the portable electronic device 1 or in display of an image or the like. As the display unit 3, an LCD (Liquid Crystal Display), an organic EL (Electro Luminescence), or an electronic paper is used. The storage unit 5 has a volatile memory, such as a DRAM (Dynamic Random Access Memory), and stores a setting state when the user performs a setting when using the portable electronic device 1.

The control unit 6 has a CPU (Central Processing Unit), a ROM (Read Only Memory), a RAM (Random Access Memory), and an interface circuit. The ROM stores a program for controlling the CPU, and the RAM is used in the operation of the CPU. The control unit 6 has (1) a pointer mode (i.e. first mode), (2) a normal mode (i.e. second mode), and (3) a setting mode (i.e. third mode), as an operation mode. The pointer mode is a mode which is used when performing a pad operation. The normal mode is the default and is a mode in which a touch position and a functional operation position are the same. The setting mode is a mode in which a coordinate-corrected X, Y region (predetermined region) is to be set up.

Similarly to an operation in the normal mode, an operation in the pointer mode is an indirect operation ("hover operation") which is performed over the touch panel 2 without direct contact with the touch panel 2. The finger is held up over the predetermined region of the touch panel 2 within a predetermined distance range, whereby the pointer is displayed at a position corresponding to the detected coordinate.

In the pointer mode, the finger moves, whereby the pointer moves by a length at a predetermined magnification to the length of the movement of the finger. In this case, the pointer moves at a predetermined magnification greater than 1. For example, when the magnification is twice, the finger moves by 1 cm, whereby the pointer moves by 2 cm. In the pointer mode, a function is executed corresponding to the position of the pointer.

The pointer mode will be described in more detail. FIGS. 3(a) and 3(b) are diagrams illustrating the pointer mode. FIG. 3(a) shows a coordinate-corrected X, Y region 20 for a right-hand operation in the display unit 3, and FIG. 3(b) shows the positional relationship between a coordinate-corrected X, Y region 20 in the touch panel 2 and a finger 10 of an indicator. First, in FIG. 3(a), in the touch panel 2, a coordinate-corrected X, Y region 20 is set to have a longitudinal rectangular shape which is a second shape in plan view. The coordinate-corrected X, Y region 20 has an area smaller than the display unit 3, and a lower right end thereof as an origin P4 substantially becomes the same position as an origin P1 of a lower right end of the display unit 3. A maximum X coordinate P5 of the coordinate-corrected X, Y region 20 is located on the origin P4 side from a maximum X coordinate P2 of the display unit 3, and a maximum Y coordinate P6 of the coordinate-corrected X, Y region 20 is located on the origin P4 side from a maximum Y coordinate P3 of the display unit 3.

As shown in FIG. 3(b), the finger 10 is held up over the coordinate-corrected X, Y region 20 within a distance range equal to or less than a first distance and greater than a second distance smaller than the first distance, whereby the coordinate (accurately, the coordinate of a fingertip) 25 of the finger 10 in a hover state is detected, and a pointer 30 is displayed at a position corresponding to the detected coordinate 25. The pointer 30 is controlled to move by the length of a predetermined magnification to the length of the movement of the finger 10 in the motion of the finger 10 in the coordinate-corrected X, Y region 20. In a case where the pointer 30 overlaps an icon (not shown) (when the icon is selected), the finger 10 approaches the touch panel 2 by the second distance or less, whereby the function corresponding to the icon is activated. In this way, in the pointer mode, since the pointer moves at a predetermined magnification with respect to the length of the motion of the finger 10, it is possible to allow easy access to an icon hard to reach with the finger by one-hand operation.

Although it is difficult to easily recognize the presence of the coordinate-corrected X, Y region 20 only by setting the coordinate-corrected X, Y region 20 in the touch panel 2, it is possible to allow the coordinate-corrected X, Y region 20 to be recognized by graphically displaying a figure representing the coordinate-corrected X, Y region 20 at a position corresponding to the coordinate-corrected X, Y region 20 of the display unit 3. However, if a figure representing the coordinate-corrected X, Y region 20 is constantly displayed, since the figure interferes with visual recognition during normal use (in the normal mode), the figure may be displayed only in the pointer mode. In particular, the figure may be displayed at predetermined transmittance (50 to 100%). The transmittance at this time is referred to as a first transmittance.

The pointer 30 may be displayed as a point shown in FIG. 3(a) or may be displayed as a symbol, such as an arrow.

Figure 4:
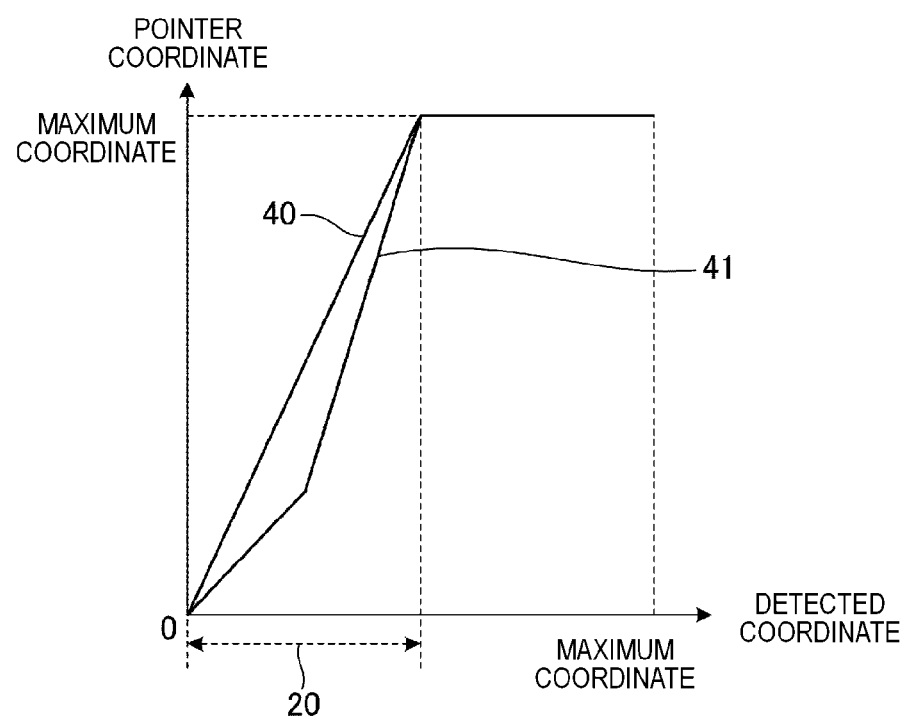
FIG. 4 is a diagram showing an example of a coordinate correction pattern which is used in the portable electronic device of FIG. 1.

The magnification of the length of the movement of the pointer 30 to the length of the movement of the finger 10 may be constant over the entire coordinate-corrected X, Y region 20 or may be different partially. FIG. 4 is a diagram showing an example of a pattern for correcting (converting) the detected coordinate 25 of the finger 10 to the coordinate of the pointer 30. A pattern 40 shown in FIG. 4 is a pattern in which a magnification is constant over the entire coordinate-corrected X, Y region 20, and a pattern 41 shown in FIG. 4 is a pattern in which a magnification changes in two stages. The pattern 41 which changes in two stages is inclined gently from the origin P4 (see FIG. 3(a)) to the substantially center and is steep at the end. That is, the magnification of the movement of the pointer 30 to the movement of the finger 10 is small from the origin P4 to the substantially center, and the magnification increases from the end. When the magnification of the movement of the pointer 30 is small, the motion of the pointer 30 to the motion of the finger 10 is made comparatively small, and to the contrary, when the magnification is large, the motion of the pointer 30 is made large. The patterns 40 and 41 shown in FIG. 4 are just examples, and various patterns are considered.

Figure 5:
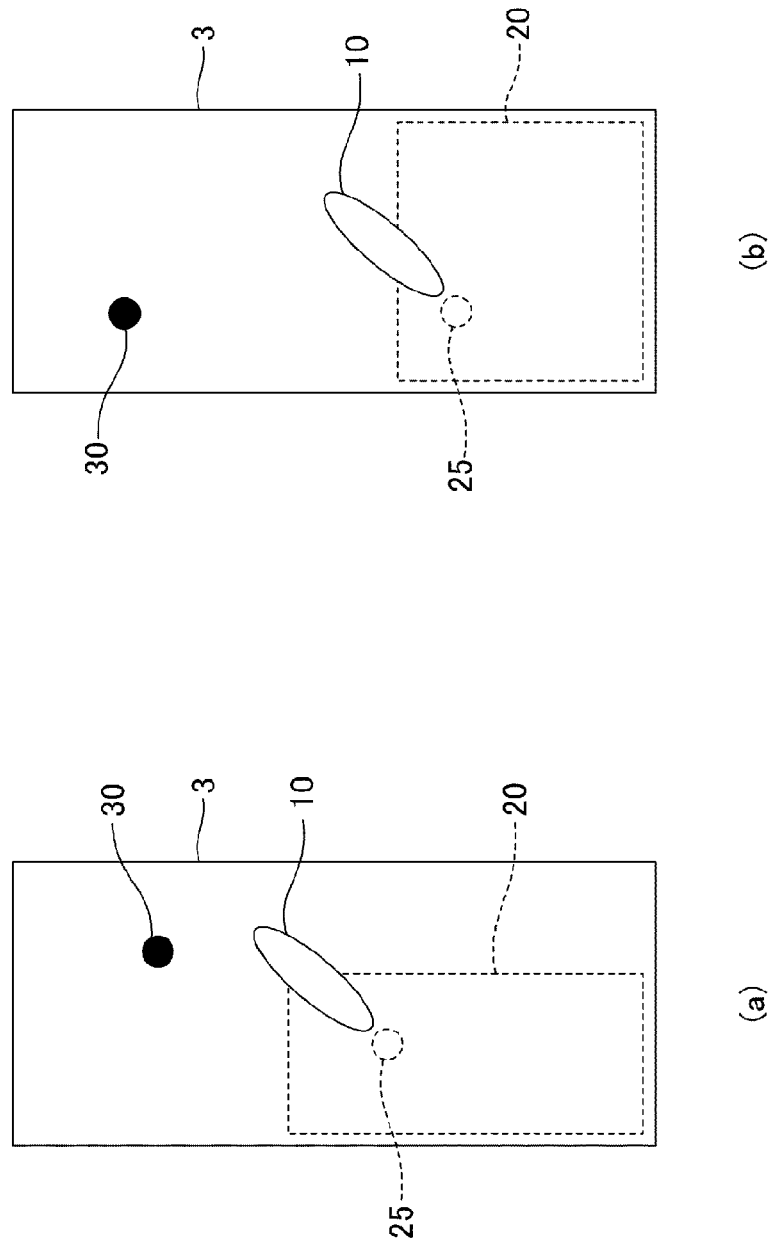
In FIG. 5, (a) and (b) are diagrams showing another setting example of a coordinate-corrected X, Y region of the portable electronic device of FIG. 1.

As shown in FIG. 3(a), the setting position of the coordinate-corrected X, Y region 20 may be set to the right of the display unit 3 for a right-hand operation, may be set to the left of the display unit 3 for a left-hand operation, or may be set below the center of the display unit 3 for a two-hand operation. FIGS. 5(a) and 5(b) are diagrams showing another setting example of the coordinate-corrected X, Y region 20, and specifically, FIG. 5(a) shows a coordinate-corrected X, Y region 20 for a left-hand operation and FIG. 5(b) shows a coordinate-corrected X, Y region 20 for a two-hand operation. The shape of the coordinate-corrected X, Y region 20 and the shape of the display unit 3 have a similitude relationship, whereby it is possible to intuitively perform the operation of the pointer 30. In this case, the predetermined magnification is substantially the same as the similitude ratio between the display unit 3 having the first shape and the coordinate-corrected X, Y region 20 having the second shape.

The second distance may be 0 (zero). The second distance is set to 0, whereby the operation range in the pointer mode can be set from the first distance to just before contact with touch panel 2.

Figure 6:
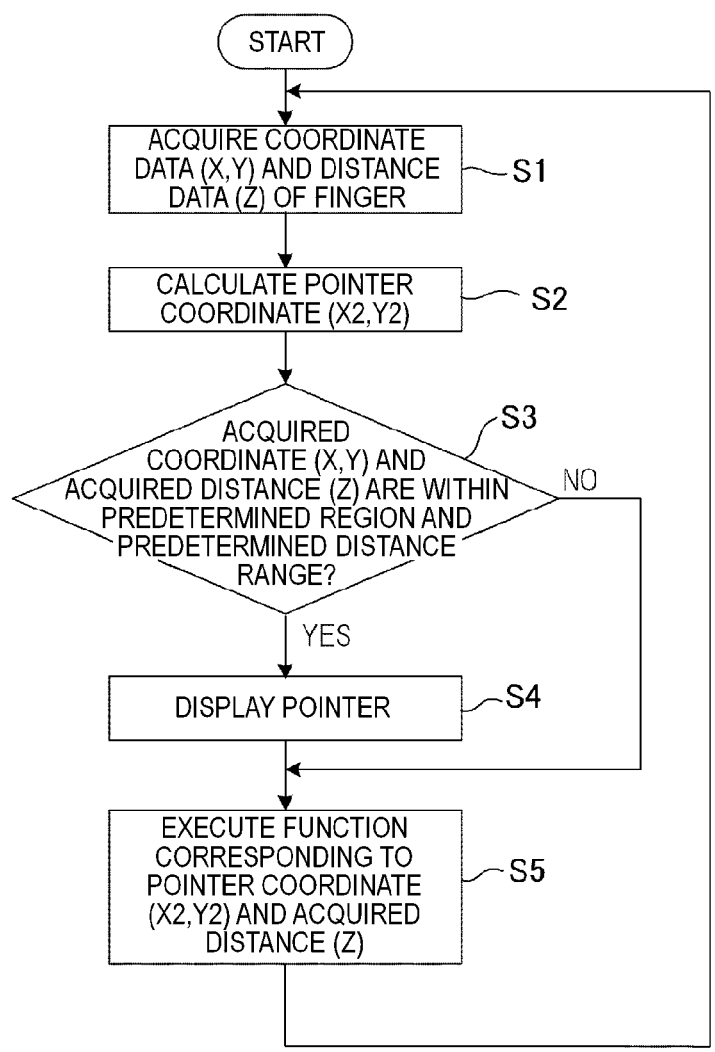
FIG. 6 is a flowchart illustrating an operation in a pointer mode of the portable electronic device of FIG. 1.

FIG. 6 is a flowchart illustrating an operation in the pointer mode. In FIG. 6, the control unit 6 acquires coordinate data (X,Y) and distance data (Z) of the finger 10 output from the touch panel 2 (Step S1). The control unit 6 calculates the pointer coordinate (X2,Y2) from the acquired coordinate data (X,Y) and distance data (Z) of the finger 10 (Step S2). At this time, the pattern 40 or the pattern 41 shown in FIG. 4 is used. The control unit 6 determines whether or not the finger 10 is located at a distance from the touch panel 2 equal to or less than the first distance and greater than the second distance smaller than the first distance in the coordinate-corrected X, Y region 20 (Step S3).

When the determination of Step S3 is "YES", the control unit 6 displays the pointer 30 at the position of the coordinate (X2,Y2) of the pointer 30 corresponding to the coordinate of the finger 10 (Step S4). A function corresponding to the pointer coordinate (X2,Y2) and the acquired distance (Z) is executed (Step S5). After this process is performed, the procedure returns to Step S1. When the determination of Step S3 is "NO", the pointer is not displayed and the function corresponding to the pointer coordinate (X2,Y2) and the acquired distance (Z) is executed (Step S5). After this process is performed, the procedure returns to Step S1.

Figure 7:
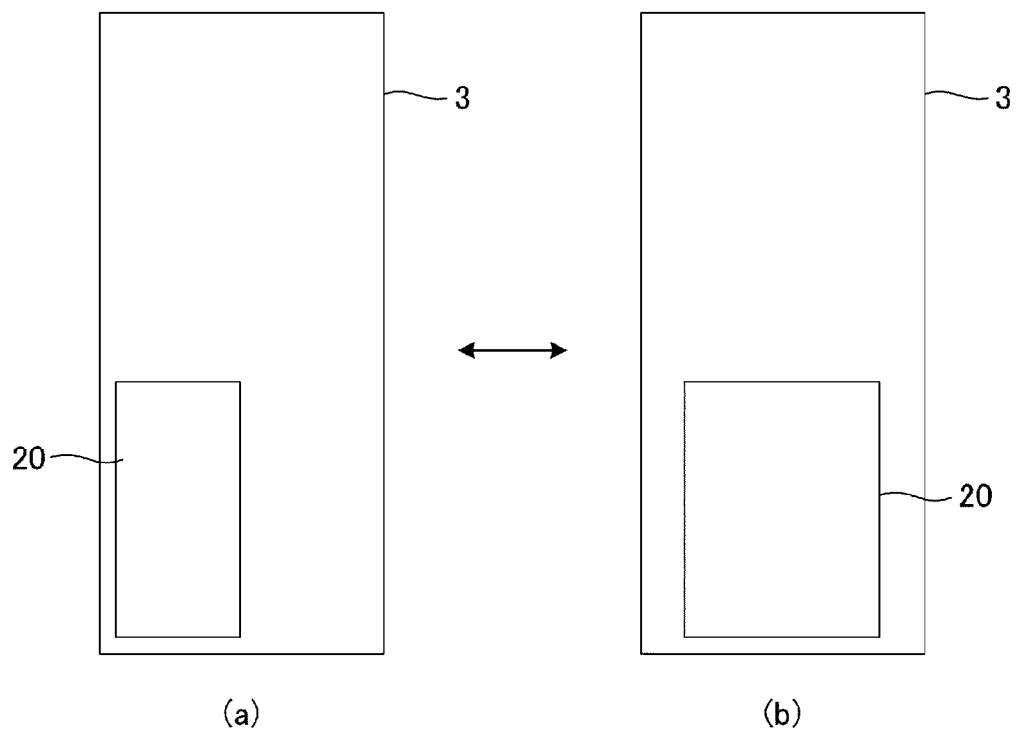
In FIG. 7, (a) and (b) are diagrams illustrating a setting mode in the portable electronic device of FIG. 1.

Next, the setting mode will be described. The selection of the setting mode allows the user to arbitrarily change the size or position of the coordinate-corrected X, Y region 20. FIGS. 7(a) and 7(b) are diagrams illustrating the setting mode. FIG. 7(a) shows an example where the coordinate-corrected X, Y region 20 is set to a region corresponding to the lower left end of the display unit 3, and FIG. 7(b) shows an example where the coordinate-corrected X, Y region 20 is set to a region corresponding to the lower end central portion of the display unit 3. The adjustment of the size of the coordinate-corrected X, Y region 20 can be freely performed by a so-called pinch-in operation or pinch-out operation. That is, the pinch-out operation is performed when increasing the coordinate-corrected X, Y region 20, and the pinch-in operation is performed when decreasing the coordinate-corrected X, Y region 20. The adjustment of the position of the coordinate-corrected X, Y region 20 can be freely performed by a so-called hold-and-drag operation. That is, when moving the coordinate-corrected X, Y region 20 in the longitudinal direction, an operation to hold the coordinate-corrected X, Y region 20 and then to drag the coordinate-corrected X, Y region 20 in the longitudinal direction is performed.

In the setting mode, similarly to the pointer mode, a figure representing the coordinate-corrected X, Y region 20 is displayed. In particular, in the setting mode, transmittance may be set to second transmittance (0 to 50%) smaller than the first transmittance (50 to 100%) in the pointer mode such that the figure representing the coordinate-corrected X, Y region 20 can be visually recognized clearly. That is, the figure may be displayed darker than in the pointer mode.

Figure 8:
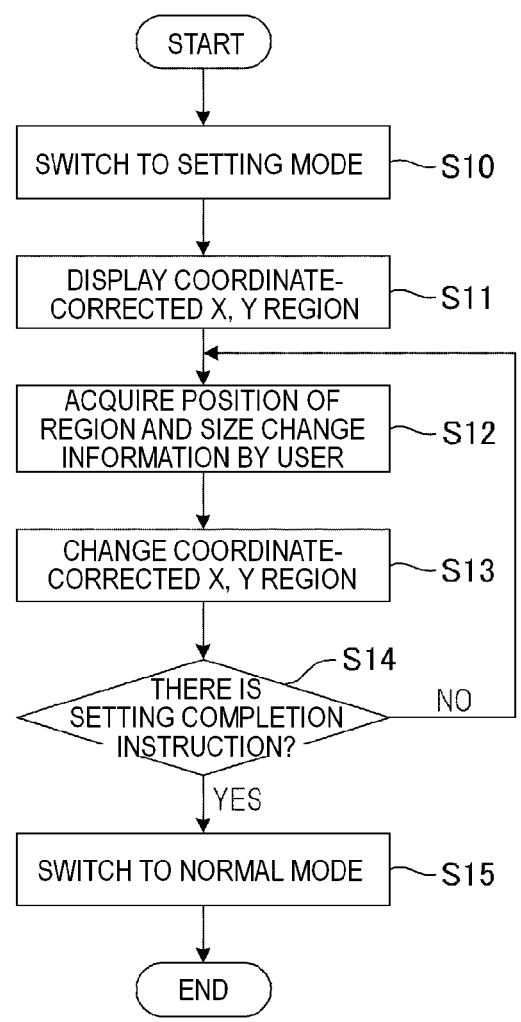
FIG. 8 is a flowchart illustrating a changing operation of a coordinate-corrected X, Y region in the portable electronic device of FIG. 1.

FIG. 8 is a flowchart illustrating a changing operation of a coordinate-corrected X, Y region to customize the coordinate-corrected X, Y region 20. In FIG. 8, the control unit 6 first performs switching from the normal mode to the setting mode (Step S10). After switched to the setting mode, the coordinate-corrected X, Y region 20 is displayed on the display unit 3 (Step S11). Next, the control unit 6 acquires position and size change information of the coordinate-corrected X, Y region 20 by the user (Step S12). If the user performs the pinch-in operation, the pinch-out operation, or the hold-and-drag operation, the position and size change information is obtained. After acquiring the position and size change information, the control unit 6 changes the position and/or size of the coordinate-corrected X, Y region 20 according to information (Step S13). After changing the position and/or size of the coordinate-corrected X, Y region 20, the control unit 6 determines whether or not there is a setting completion instruction from the user (Step S14), if there is no setting completion instruction, returns to Step S12, and acquires the position and size change information of the coordinate-corrected X, Y region 20 by the user. Meanwhile, if there is a setting completion instruction, switching to the normal mode is performed (Step S15), and this process ends. In this way, the user can freely customize the position and/or size of the coordinate-corrected X, Y region 20.

Figure 9:
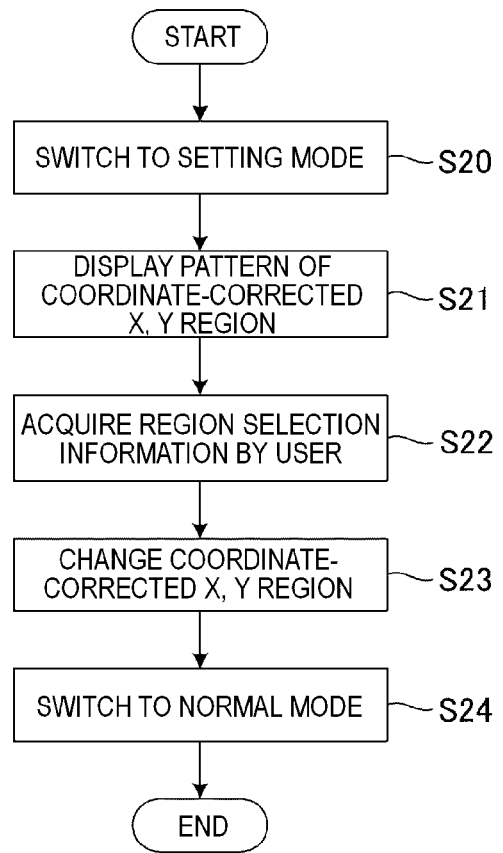
FIG. 9 is a flowchart illustrating a changing operation of a coordinate-corrected X, Y region in the portable electronic device of FIG. 1.

FIG. 9 is a flowchart illustrating a changing operation of a coordinate-corrected X, Y region to select a desired coordinate-corrected X, Y region 20 from a plurality of patterns of coordinate-corrected X, Y regions 20. In FIG. 9, the control unit 6 first performs switching from the normal mode to the setting mode (Step S20). After switched to the setting mode, a plurality of patterns of coordinate-corrected X, Y regions 20 are displayed on the display unit 3 (Step S21). Next, the control unit 6 acquires region selection information by the user (Step S22). That is, information representing a coordinate-corrected X, Y region 20 of a pattern selected by the user is acquired. After acquiring the region selection information, the coordinate-corrected X, Y region 20 is changed (Step S23). That is, the coordinate-corrected X, Y region 20 is replaced with the coordinate-corrected X, Y region 20 of the pattern selected by the user. After changing the coordinate-corrected X, Y region 20, switching to the normal mode is performed (Step S24), and this process ends. In this way, the user can select a desired coordinate-corrected X, Y region 20 from a plurality of patterns of coordinate-corrected X, Y regions 20.

In this way, the portable electronic device 1 of this embodiment includes the display unit 3 on which the pointer 30 is displayable, and the touch panel 2 which is arranged to overlap the display unit 3 and is capable of detecting the distance from the finger 10 of an indicator. The pointer 30 moves according to the movement of the finger 10, and when the distance between the finger 10 and the touch panel 2 is equal to or less than the first distance and greater than the second distance smaller than the first distance in the coordinate-corrected X, Y region 20 of the touch panel 2, the pointer 30 moves by the length of the predetermined magnification (greater than 1) to the length of the movement of the finger 10, whereby it is possible to allow easy access to an icon hard to reach with the finger 10 by the one-hand operation. The coordinate-corrected X, Y region 20 of the touch panel 2 virtually serves as a pad, and the region 20 is transmissive, whereby it is possible to effectively use the display region of the display unit 3 without causing a decrease in effective display area of the display unit 3.

In the portable electronic device 1 of this embodiment, although programs in which the process shown in the flowchart of FIG. 6 and the process shown in the flowchart of FIG. 8 or 9 are respectively described are provided in the ROM, the programs may be distributed in a state of being stored in a storage medium, such as a magnetic disk, an optical disk, a magneto-optical disk, or a flash memory, or may be stored in a server (not shown) on a network, such as the Internet, and may be downloaded using a telecommunication line.

Although the portable electronic device 1 of this embodiment is applied to a mobile radio device, called a smartphone, the present invention is not limited to a mobile radio device, and may be applied to appliances, such as a microwave oven, or an operation panel of a navigation system of an automobile or the like.

Switching between the normal mode and the pointer mode will be described.

Figure 10:
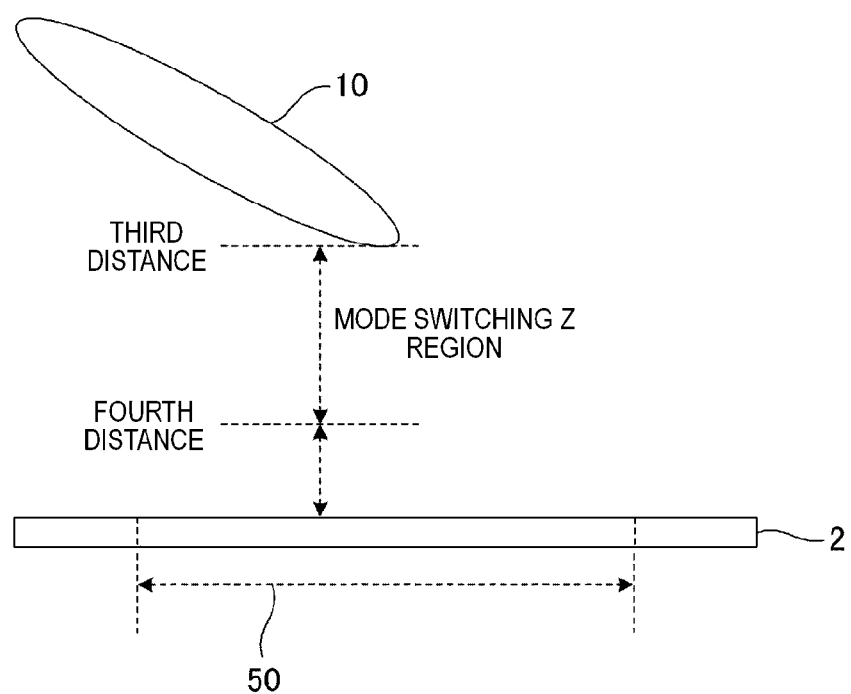
FIG. 10 is a diagram showing the positional relationship between a mode-switching X, Y region and a finger of an indicator in a touch panel of the portable electronic device of FIG. 1.

FIG. 10 is a diagram showing the positional relationship between a mode-switching X, Y region 50 in the touch panel 2 and the finger 10 of an indicator. In the touch panel 2, the mode-switching X, Y region 50 is set to have an area smaller than the display unit 3. The finger 10 is held up over the mode-switching X, Y region 50 within a distance range equal to or less than a third distance and greater than a fourth distance smaller than the third distance, whereby switching from the normal mode to the pointer mode is performed. When the pointer mode is executed at present, switching to the normal mode is performed.

Figure 11:
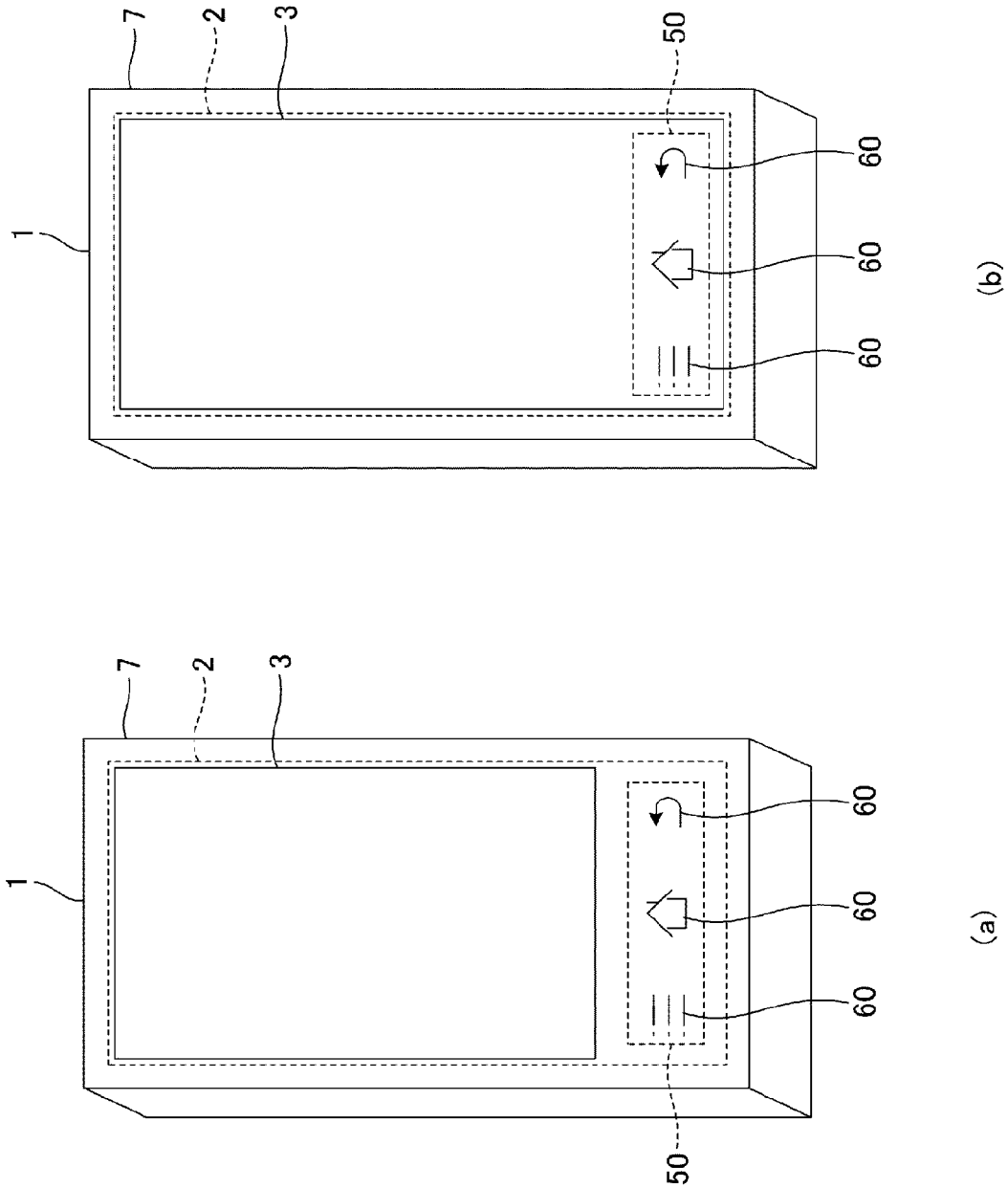
In FIG. 11, (a) and (b) are diagrams showing a setting example (1) of a mode-switching X, Y region in the portable electronic device of FIG. 1.

FIGS. 11(a) and 11(b) are diagrams showing a setting example (1) of the mode-switching X, Y region 50. FIG. 11(a) shows an example where the length in the longitudinal direction of the display unit 3 is shorter than the touch panel 2 and a portion of the touch panel 2 not overlapping the display unit 3 is set as the mode-switching X, Y region 50, and FIG. 11(b) shows an example where the touch panel 2 and the display unit 3 substantially have the same size and a lower end portion of the touch panel 2 overlapping the display unit 3 is set as the mode-switching X, Y region 50. In both examples, the finger 10 is held up over the mode-switching X, Y region 50 for a predetermined time within a distance range equal to or less than the third distance and greater than the fourth distance smaller than the third distance, whereby switching between the normal mode and the pointer mode is performed. In FIGS. 11(a) and 11(b), although a mark 60 is indicated on the touch panel 2, the mark 60 and a mode switching function are regarded as distinct from each other.

Figure 12:
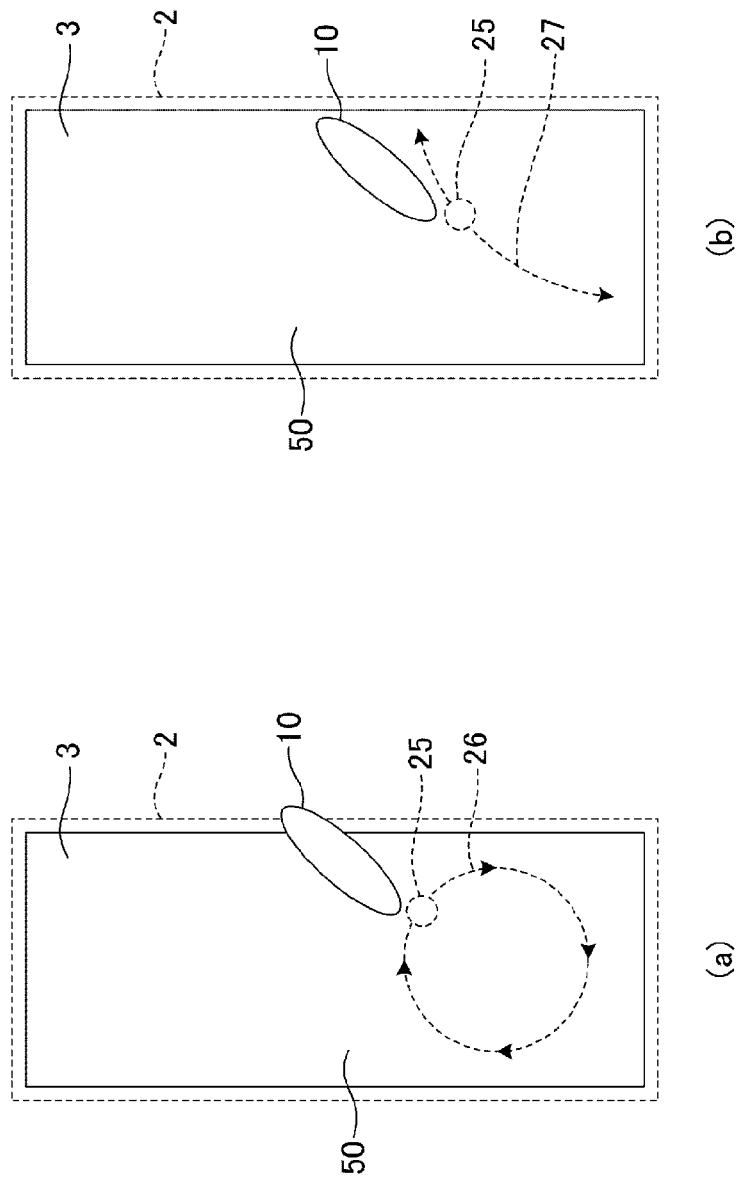
In FIG. 12, (a) and (b) are diagrams showing a setting example (2) of a mode-switching X, Y region in the portable electronic device of FIG. 1.

FIGS. 12(a) and 12(b) are diagrams showing a setting example (2) of the mode-switching X, Y region 50. FIGS. 12(a) and 12(b) show an example where the mode-switching X, Y region 50 substantially has the same size as the display unit 3. In FIG. 12(a), the finger 10 moves so as to draw a circle over the mode-switching X, Y region 50 within a distance range equal to or less than the third distance and greater than the fourth distance smaller than the third distance, whereby switching between the normal mode and the pointer mode is performed. For example, if the finger 10 moves so as to draw a circle clockwise (first operation), switching from the normal mode to the pointer mode is performed, and if the finger 10 moves so as to draw a circle counterclockwise (second operation), switching from the pointer mode to the normal mode is performed. In FIG. 12(a), a locus 26 of the detected coordinate 25 is a locus along which the finger 10 moves, and is not displayed. The first operation and the second operation may indicate the common operation.

In FIG. 12(b), the finger 10 moves so as to draw a fan in shape over the mode-switching X, Y region 50 within a distance range equal to or less than the third distance and greater than the fourth distance smaller than the third distance, whereby switching between the normal mode and the pointer mode is performed. For example, if the finger 10 moves so as to draw a fan from bottom to top (first operation), switching from the normal mode to the pointer mode is performed, and if the finger 10 moves so as to draw a fan from top to bottom (second operation), switching from the pointer mode to the normal mode is performed. In FIG. 12(b), a locus 27 of the detected coordinate 25 is a locus along which the finger 10 moves, and is not displayed. The first operation and the second operation may indicate the common operation.

In this way, a gesture for moving the finger 10 so as to draw a circle or for moving the finger 10 so as to draw a fan is detected, whereby switching between the normal mode and the pointer mode is performed.

Figure 13:
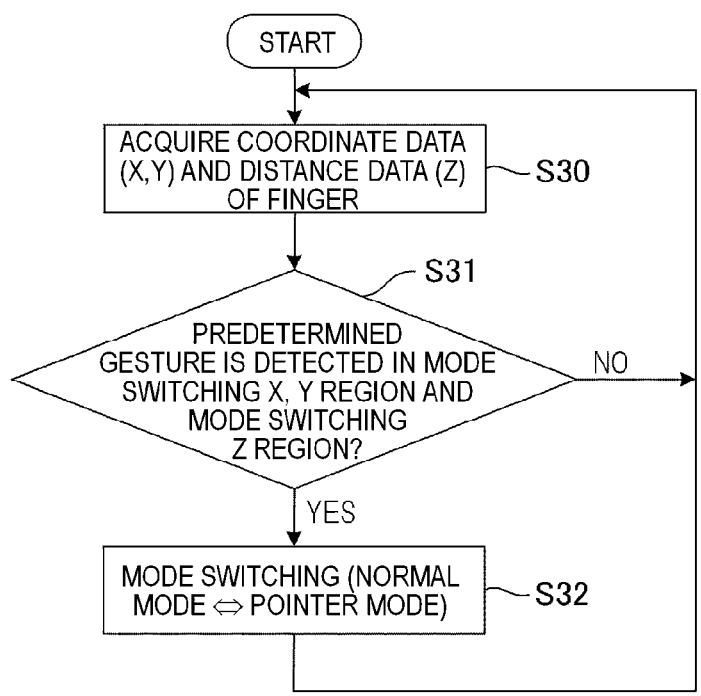
FIG. 13 is a flowchart illustrating a switching operation between a normal mode and a pointer mode in the portable electronic device of FIG. 1.

FIG. 13 is a flowchart showing an operation of an example where switching between the normal mode and the pointer mode is performed by gesture detection. In FIG. 13, the control unit 6 acquires coordinate data (X,Y) and distance data (Z) of the finger 10 output from the touch panel 2 (Step S30). The control unit 6 determines whether or not a predetermined gesture of the finger 10 could be detected over the mode-switching X, Y region 50 from the acquired coordinate data (X,Y) and the distance data (Z) of the finger 10 (Step S31). When a predetermined gesture could be detected over the mode-switching X, Y region 50 (when the determination is "YES"), the mode is switched (Step S32). For example, as in FIG. 12(a), when the finger 10 moves so as to draw a circle clockwise, switching from the normal mode to the pointer mode is performed, and when the finger 10 moves so as to draw a circle counterclockwise, switching from the pointer mode and the normal mode is performed. After mode switching is performed, the procedure returns to Step S30. In the determination of Step S31, when a predetermined gesture could be detected over the mode-switching X, Y region 50 (when the determination is "NO"), any process is not performed and the procedure returns to Step S30.

A program in which the process shown in the flowchart of FIG. 13 may be provided in the ROM, or the program may be distributed in a state of being stored in a storage medium, such as a magnetic disk, an optical disk, a magneto-optical disk, or a flash memory or may be stored in a server (not shown) on a network, such as the Internet, or may be downloaded using a telecommunication line.

Although the present invention has been described in connection with the specific embodiment, the present invention is not limited to the embodiment, and various changes may be made without departing from the technical spirit of the present invention.

The present application is based on Japanese Patent Application No. 2012-201617 filed on Sep. 13, 2012, the contents of which are incorporated herein by reference.

INDUSTRIAL APPLICABILITY

The present invention can allow easy access to an icon at a position hard to reach with a finger by one-hand operation, can effectively use the display region of the display unit, and can be applied to a portable electronic device using an electrostatic capacitance type touch panel, such as a smartphone.

REFERENCE SIGNS LIST

1: portable electronic device
2: touch panel
3: display unit
5: storage unit
6: control unit
7: housing
10: finger
20: coordinate-corrected X, Y region
25: detected coordinate
30: pointer
40, 41: pattern
50: mode-switching X, Y region
60: mark

The invention claimed is:

1. A portable electronic device, comprising:
a display;
a touch panel, at least a part of which is arranged to overlap the display, the touch panel being capable of detecting an indicator which is separate from the touch panel by a predetermined distance; and
a predetermined region arranged at an end portion of the touch panel, wherein
the portable electronic device includes:
a first mode in which when the distance between the indicator and the touch panel is equal to or less than a first distance and is greater than a second distance smaller than the first distance, the display displays a pointer that moves according to a movement of the indicator, wherein a length of the movement of the pointer has a predetermined magnification greater than 1 with respect to a length of the movement of the indicator; and
a second mode in which an xy coordinate moves in correspondence with one time magnification of the movement of the indicator, and
in the second mode, when a predetermined operation is performed in a state where the distance between the indicator and the touch panel in the predetermined region is equal to or less than a third distance and is greater than a fourth distance smaller than the third distance, the portable electronic device is switched to the first mode.

2. The portable electronic device according to claim 1, wherein
in the first mode, when the predetermined operation is performed in a state where the distance between the indicator and the touch panel in the predetermined region is equal to or less than the third distance and is greater than the fourth distance smaller than the third distance, the portable electronic device is switched to the second mode.

3. The portable electronic device according to claim 1, wherein in the second mode, when a state where the distance between the indicator and the touch panel in the predetermined region is equal to or less than the third distance and is greater than the fourth distance smaller than the third distance continues in a predetermined time period, the portable electronic device is switched to the first mode.

4. The portable electronic device according to claim 1, wherein in the second mode, when an operation of drawing a circle is performed in a state where the distance between the indicator and the touch panel in the predetermined region is equal to or less than the third distance and is greater than the fourth distance smaller than the third distance, the portable electronic device is switched to the first mode.

5. The portable electronic device according to claim 1, wherein in the second mode, when an operation of drawing a fan is performed in a state where the distance between the indicator and the touch panel in the predetermined region is equal to or less than the third distance and is greater than the fourth distance smaller than the third distance, the portable electronic device is switched to the first mode.

6. The portable electronic device according to claim 1, wherein the predetermined region is arranged in a lower end portion of the touch panel.

7. The portable electronic device according to claim 1, wherein a predetermined mark is indicated in the predetermined region.

8. The portable electronic device according to claim 7, wherein the predetermined mark is a mark unrelated to a switching between the first mode and the second mode.

9. The portable electronic device according to claim 1, wherein the movement of the indicator is a movement along a surface of the touch panel.

10. The portable electronic device according to claim 1, wherein an icon is displayable on the display, and in the first mode, when the pointer overlaps the icon, and when the distance is at least equal to or less than the second distance, a function corresponding to the icon is activated.

* * * * *